(12) United States Patent
Long et al.

(10) Patent No.: US 9,330,134 B2
(45) Date of Patent: May 3, 2016

(54) USER IDENTITY MAPPING SYSTEM AND METHOD OF USE

(71) Applicant: FairWarning, Inc., Clearwater, FL (US)

(72) Inventors: Kurt James Long, St. Petersburg, FL (US); Christopher R. Arnold, Tampa, FL (US); Michael B. Lyons, Tampa, FL (US); Michael P. Keane, Clearwater, FL (US)

(73) Assignee: FAIRWARNING IP, LLC, Clearwater, FL (US)

( * ) Notice: Subject to any disclaimer, the term of this patent is extended or adjusted under 35 U.S.C. 154(b) by 0 days.

(21) Appl. No.: 14/244,403

(22) Filed: Apr. 3, 2014

(65) Prior Publication Data

US 2014/0207813 A1    Jul. 24, 2014

Related U.S. Application Data

(63) Continuation-in-part of application No. 13/959,445, filed on Aug. 5, 2013, now abandoned, which is a continuation of application No. 11/687,864, filed on Mar. 19, 2007, now Pat. No. 8,578,500, which is a continuation of application No. 11/420,645, filed on May 26, 2006, now abandoned.

(60) Provisional application No. 60/685,655, filed on May 31, 2005.

(51) Int. Cl.
*G06F 7/04* (2006.01)
*G06F 12/14* (2006.01)
*H04L 29/06* (2006.01)
*G06F 17/30* (2006.01)
*G06F 21/55* (2013.01)
*G06Q 10/06* (2012.01)
*G06F 21/62* (2013.01)

(52) U.S. Cl.
CPC .......... *G06F 17/30386* (2013.01); *G06F 21/55* (2013.01); *G06Q 10/063* (2013.01); *G06Q 10/0635* (2013.01); *G06F 21/6218* (2013.01); *H04L 63/08* (2013.01); *H04L 63/102* (2013.01); *H04L 63/1408* (2013.01)

(58) Field of Classification Search
CPC ... H04L 63/08; H04L 63/102; H04L 63/1408; G06F 21/6218
USPC .......................................... 726/4, 22; 713/165
See application file for complete search history.

(56) References Cited

U.S. PATENT DOCUMENTS 5,557,742 A    9/1996    Smaha et al.
5,828,837 A *  10/1998    Eikeland ...................... 709/202

(Continued)

FOREIGN PATENT DOCUMENTS

EP    1054529 A2    11/2000

OTHER PUBLICATIONS

Denning D E: "An Intrusion-Detection Model," IEEE Transactions on Software Engineering, IEEE Service Center, Los Alamitos, CA, vol. SE-13, No. 2, Feb. 1, 1987< pp. 222-232.

(Continued)

*Primary Examiner* — Aravind Moorthy
(74) *Attorney, Agent, or Firm* — Hauptman Ham, LLP

(57) ABSTRACT

An identity mapping system includes an identity mapping database and a master user table (MUT) communicatively coupled with the identity mapping database. The MUT includes a record having at least one record data field, a unique user identification (ID) field and at least one user data field. The at least one user data field contains data from a software application.

34 Claims, 12 Drawing Sheets

(56) References Cited

U.S. PATENT DOCUMENTS

| | | | |
|---|---|---|---|
| 6,347,374 B1 | 2/2002 | Drake et al. | |
| 6,405,318 B1 | 6/2002 | Rowland | |
| 6,549,208 B2 | 4/2003 | Maloney et al. | |
| 6,789,202 B1 | 9/2004 | Ko et al. | |
| 7,058,663 B2 * | 6/2006 | Johnston et al. | |
| 2002/0063735 A1 * | 5/2002 | Tamir et al. | 345/745 |
| 2003/0101254 A1 * | 5/2003 | Sato | 709/223 |
| 2003/0212617 A1 * | 11/2003 | Stone et al. | 705/30 |
| 2003/0229519 A1 | 12/2003 | Eidex et al. | |
| 2004/0054569 A1 * | 3/2004 | Pombo et al. | 705/7 |
| 2004/0193482 A1 * | 9/2004 | Hoffman et al. | 705/14 |
| 2004/0193882 A1 * | 9/2004 | Singerle, Jr. | 713/168 |
| 2004/0260945 A1 | 12/2004 | Raikar et al. | |
| 2005/0021643 A1 * | 1/2005 | Watanabe et al. | 709/206 |
| 2005/0027848 A1 | 2/2005 | Kamenetsky et al. | |
| 2006/0041475 A1 * | 2/2006 | Sullivan et al. | 705/14 |
| 2006/0195816 A1 * | 8/2006 | Grandcolas et al. | 717/101 |
| 2006/0282660 A1 | 12/2006 | Varghese et al. | |
| 2007/0039049 A1 | 2/2007 | Kuferman et al. | |
| 2012/0054625 A1 * | 3/2012 | Pugh | G06F 21/41 715/736 |

OTHER PUBLICATIONS

Debar et al.: "Towards a taxonomy of intrusion-detection systems," Computer Networks, Elsevier Science Publishers B.V., Amsterdam, NL, vol. 31, No. 8, Apr. 23, 1999, pp. 805-822.

European Search Report for 08 743 964.2 dated May 9, 2011.

"Security Management" eTrust Audit. 2006. http://www3.ca.com/solutions/Product.aspx?ID=157.

* cited by examiner

USER IDENTITY MAPPING SYSTEM AND METHOD OF USE

CROSS-REFERENCE TO RELATED APPLICATIONS

This application is a continuation-in-part of U.S. patent application Ser. No. 13/959,445, filed on Aug. 5, 2013, which is a continuation of U.S. patent application Ser. No. 11/687,864, now U.S. Pat. No. 8,578,500, filed on Mar. 19, 2007, which is a continuation-in-part of patent application Ser. No. 11/420,645, filed on May 26, 2006, which claims priority to Provisional Patent Application Ser. No. 60/685,655, filed on May 31, 2005, all of which are incorporated herein by reference in their entirety.

BACKGROUND

Current workplace electronic environments often include a wide variety of seemingly ever changing software applications. These software applications provide functionality to users deemed beneficial by the organizations that employ those users, but often carry considerable costs and/or risks associated with their use. Ensuring each user has access to a proper mix of software applications corresponding to their specific responsibilities, and no more, is a persistent workplace problem. Furthermore, the set of users themselves is also ever changing with users often routinely being hired, terminated, promoted, reassigned and having their responsibilities changed. Complicating matters still further, individual users of those software applications typically have more than one user name associated their access to different software applications in the workplace. The dynamic nature of available software applications and their users in combination with a proliferation of usernames makes it difficult to ensure intended beneficial software application access is provided while managing cost and considerable, or even serious, security risk. It would be desirable to mitigate or resolve at least some of these problems.

BRIEF DESCRIPTION OF THE DRAWINGS

One or more embodiments are illustrated by way of example, and not by limitation, in the figures of the accompanying drawings, wherein elements having the same reference numeral designations represent like elements throughout. It is emphasized that, in accordance with standard practice in the industry various features may not be drawn to scale and are used for illustration purposes only. In fact, the dimensions of the various features in the drawings may be arbitrarily increased or reduced for clarity of discussion.

DETAILED DESCRIPTION

Figure 1:
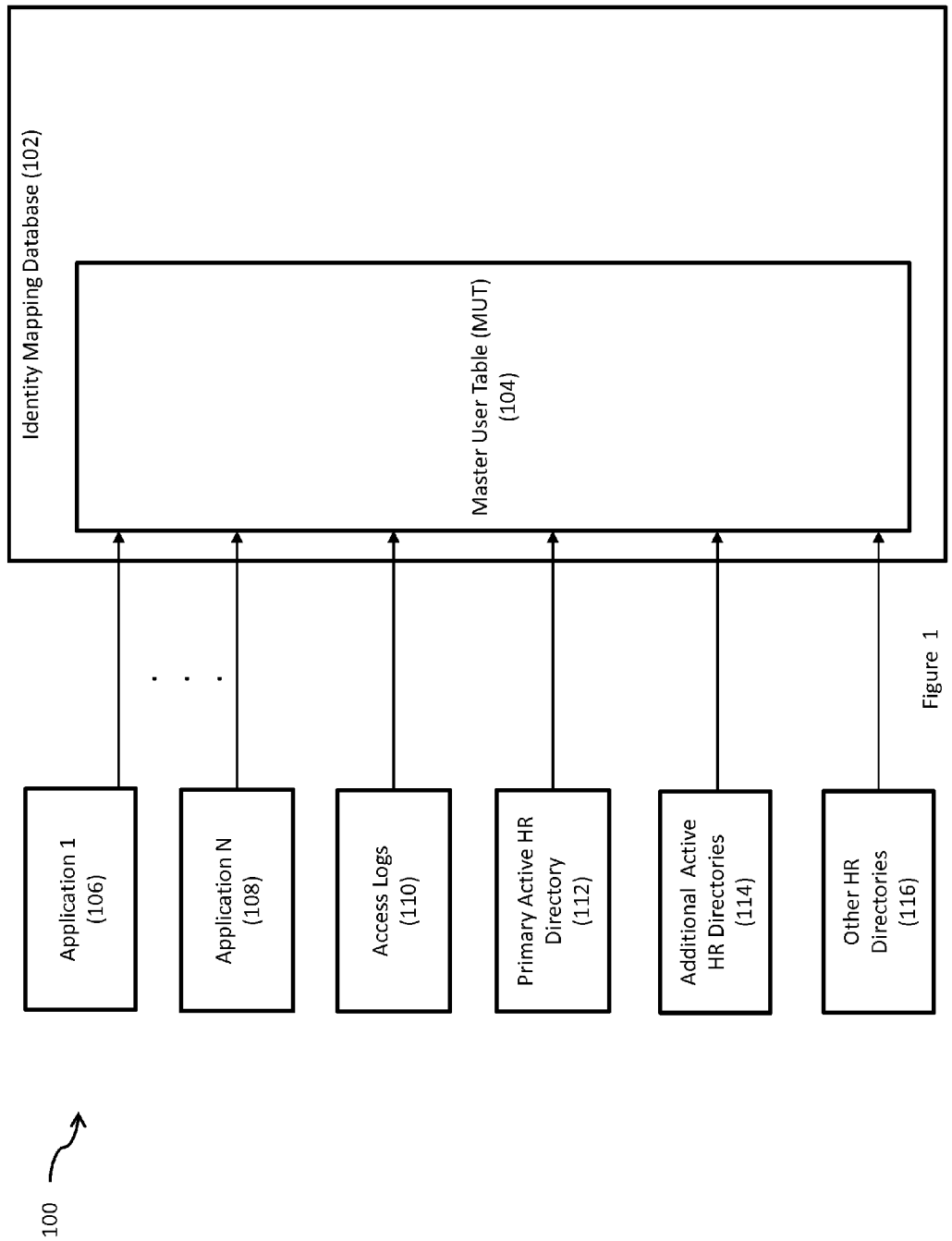
FIG. 1 is a block diagram of an identity mapping system in accordance with some embodiments.

The following disclosure provides many different embodiments, or examples, for implementing different features of the invention. Specific examples of components and arrangements are described below to simplify the present disclosure. These are examples and are not intended to be limiting.

Ensuring intended beneficial software application access is provided to users in an organization while simultaneously managing cost and risk is often a difficult task, especially in larger organizations having a proliferation of different software applications. Identifying and tracking software application users is made more difficult due to the changing set of users and user responsibilities over time. An identity mapping system gathers and organizes user data from multiple repositories including software application access logs (also known as event logs and audit logs), software application user lists, human resource databases, etc., to create a unique user identity database that includes a master user table (MUT). For each user, including each user that has multiple usernames and accounts, an identity mapping system and method assigns one unique user identity (ID) code to each of those users. Searches of information stored in a record with a unique user ID code is used to enable examination of user activity disclosed by access logs to determine more complete user information such as full name, home address, physical location of work, department, supervisor, scope of applications, recommended role, etc. Uniquely identifying each user, and the software applications they are accessing and have access to, enables better management of software access. For example, a user may not have access to certain beneficial software applications the organization that employs him/her wants that user to have and may have access to other applications not necessary to that user's responsibilities, resulting in both deficient access and excessive cost. Uniquely identifying each user and automatically recommending certain software applications be added and/or deleted results in beneficial improvements in efficiency, regulatory compliance, cost savings and risk reduction for the organization.

User information is acquired from a wide variety of sources, prioritized, selected based on that prioritization, and stored in the master user table (MUT) communicatively coupled within the identity mapping database to create a more complete software application access description associated with each unique user identity. Identifying and associating each software application user name with a specific individual having a unique user identification (ID) enables software application access to be more efficiently managed. For example, a new employee title given to a user having been recently promoted is used to suggest adding access to software applications (provisioning) and/or discontinuing access to software applications (deprovisioning) for that user based on changed responsibilities. Proper management of software application access enables a recently promoted user to more quickly gain access to beneficial software applications and discontinue access to unnecessary software applications, thereby promoting efficiency while reducing cost and risk in the organization.

FIG. 1 is a block diagram of an identity mapping system 100 in accordance with some embodiments. The identity mapping system 100 includes an identity mapping database 102, such as a commercially available relational database in some embodiments. The identity mapping database 102 includes a master user table (MUT) 104. In some embodiments, the MUT 104 is a database table, a directory service or a spreadsheet. For example, in some embodiments, the master user table (MUT) 104 is a spreadsheet having a variety of user information stored in one record per row, the record having multiple columns, as described in greater detail below with regard to FIG. 2A. The MUT 104 includes record data fields, a unique user identification (ID) field and user data fields. The MUT 104 receives data from various data repositories including software application 1 106 through software application N 108, where N can be any positive integer. In some embodiments, if N=1, software application N 108 refers to software application 1 106, otherwise N refers to the last software application in a series of software applications beginning with software application 1.

Data from the N software applications 106, 108 is also prioritized by the identity mapping database 102 and selectively stored in corresponding record fields by the MUT 104 based on that priority. In some embodiments, priority rules for each field define the order of software applications from which the data for that field is taken. In some embodiments, different fields have different priority rules for the same set of software applications, because the reliability of each field varies independently from other fields. The identity mapping database 102 prioritizes data for each field relatively higher or lower depending on certain factors, such as the perceived reliability of the software applications 106, 108 providing that data. For example, in some embodiments, if software application 1 106 is a payroll system, its employee social security number field is assigned a higher priority than the same social security number field from software application N 108, where software application N 108 is an employee newsletter. Thus, the social security number is selected from the highest priority (most reliable) source available to help ensure the data collected and associated with the unique user ID in that record of the MUT 104 has improved reliability. However for other fields, such as an e-mail address field, the software applications 106, 108 are prioritized differently than the social security number field. For example, in some embodiments, the social security number field is prioritized highest to lowest in software applications 1, 2, and 3, while the e-mail address field is prioritized from highest to lowest in software applications 3, 2, and 1. Thus, the prioritization of one field does not necessarily affect the prioritization of another field. In some embodiments, differences in the same fields in different software applications 106, 108, such as different user social security numbers, are flagged and reported for further investigation by the organization.

Access logs 110, also known as event logs and/or audit logs, contain data about records accessed by users through software applications 106, 108. Data from the access logs 110 is searched and reviewed (mined) for user information by the identity mapping database 102 such that data from those access logs is selectively received by the MUT 104 and stored in corresponding fields. In some embodiments, access logs 110 include an identification of each software application 106, 108, specific records accessed, number of records accessed, start time of access, end time of access, location of access, user ID, etc. Data from access logs 110 such as user IDs from specific software applications 106, 108 is associated with a unique user ID. In some embodiments, a title field in each MUT 104 record designating a user's employee title enables specific software applications 106, 108 to be further associated with users having the same title.

Data from a primary active human resource (HR) directory 112 is prioritized by the identity mapping database 102 and selectively received by the MUT 104 based on that priority. In some embodiments, the primary active human resource (HR) directory 112 contains some of the highest priority (most reliable) data for some user data fields in the MUT 104 such as user hire date, user termination date, etc. Data from additional active HR directories 114 is also prioritized by the identity mapping database 102 and selectively received by the MUT 104 based on priority. In some embodiments, the extent of the additional active HR directories 114 varies by organization with larger organizations having undergone recent mergers more likely to have more additional HR databases than smaller, unmerged organizations.

In addition to the primary active human resource (HR) directory 112 and additional active HR directories 114, other HR directories 116 contain data prioritized by the identity mapping database 102 and selectively received by the MUT 104 based on that priority. In some embodiments, the other HR directories 116 contain data about contractors or older employee user information still useful for adding data to user data fields that are empty or contain less reliable user data having a lower priority. In some embodiments, data from each of the data repositories 106-116 includes a list of users received by the identity mapping database 102 to populate user data fields in the MUT 104.

Figure 2A:
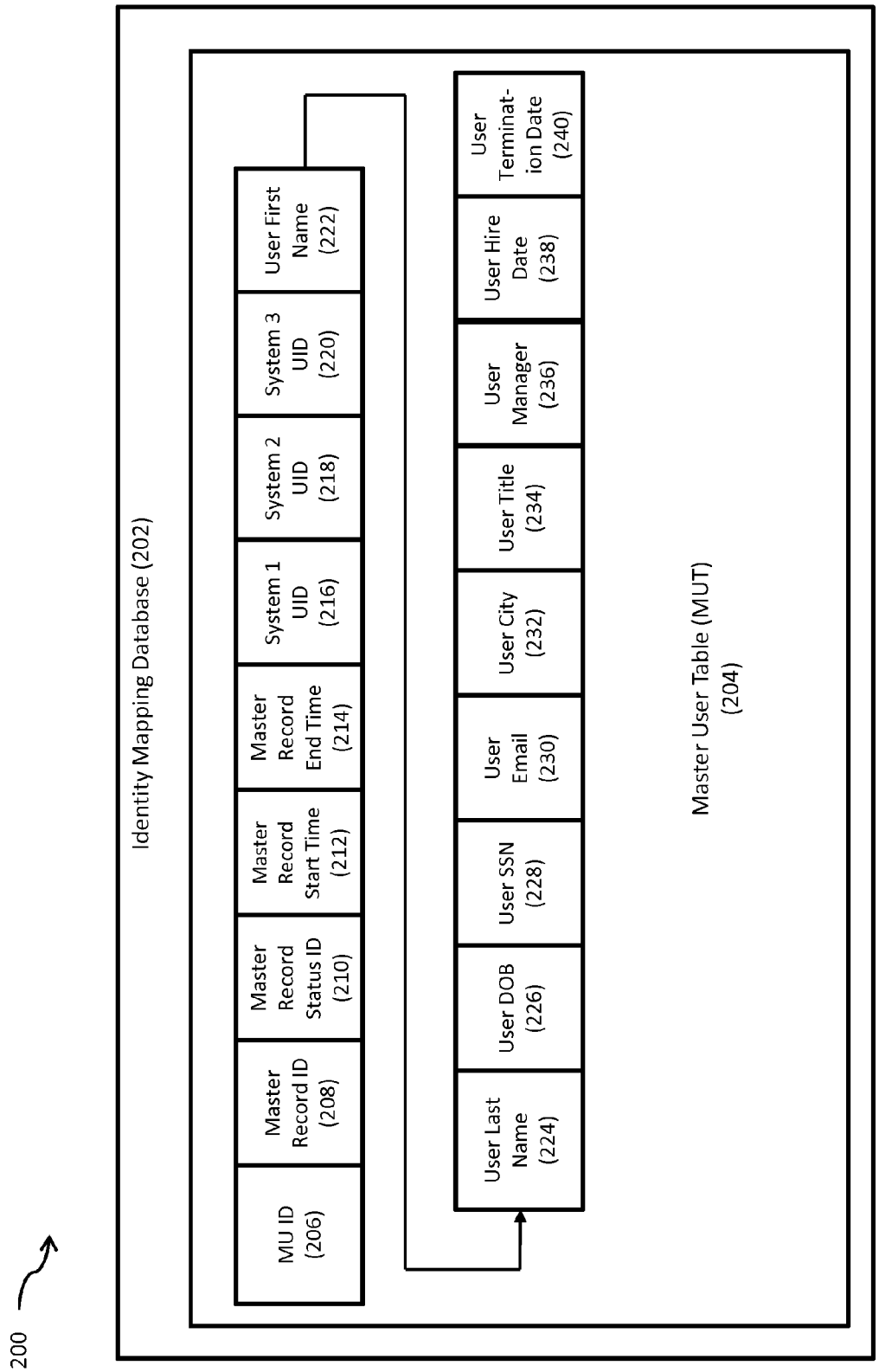
FIG. 2A is a block diagram of an identity mapping database portion of an identity mapping system in accordance with some embodiments.

FIG. 2A is a block diagram of an identity mapping database 202 portion of an identity mapping system 200 in accordance with some embodiments. The identity mapping database 202 includes a master user table (MUT) 204. In some embodiments, the identity mapping database 202 includes eighteen (18) fields in each record in a single row of a master user table (MUT) 204. In some embodiments, more than eighteen (18) fields exist in each record. In some embodiments, less than eighteen (18) fields exist in each record. While fields are illustrated in a certain order in FIG. 2A, the invention is not limited to any particular ordering of fields in the MUT 204.

A master user (MU) identification (ID) field 206 in the MUT 204 contains a unique record number associated with each record. In some embodiments, the MU ID is the row number in the MUT 204. A master record identification (ID) field 208 in the MUT 204 contains a unique user ID created for each user. The unique user ID enables the identity mapping database to uniquely identify each user and build new records for that user as more data becomes available. A master record status ID field 210 in the MUT 204 provides an indication of how recent the record is. For example, in some embodiments when the master record status ID field contains numerical 0 that designates the record as the most recent for that user, a status of 1 designates the record as being in the process of being entered and therefore unavailable and a status of 2 indicates the record is not the most recent record having that unique user ID in the corresponding master record ID field 208.

A master record start time field 212 and a master record stop time field 214 in the MUT 204 indicate the relevant time period covered by the record. In some embodiments a difference in time between the master record end time field 214 and the master record start time field 212 is on the order of a few minutes. In some embodiments a difference in time between the master record stop time field 214 and the master record start time field 212 is on the order of a day or more. In some embodiments, a MUT record having a valid entry in the master record start time field 212, but no corresponding valid entry in the master record stop time field 214, indicates that record is the most current record.

In some embodiments the MUT 204 includes a system 1 user ID (UID) field 216, a system 2 UID field 218 and a system 3 UID field 220. Each of the UID fields 216, 218, 220 contains a user ID for different software applications associated with the unique user ID in the master record ID 208. The number of UID fields 216, 218, 220 can be any number N, as described above. In some embodiments, for example, system 1 UID field 216 is a user's first name and last name, system 2 UID 218 is the user's social security number and system 3 UID field 220 is the user's initials.

A user first name field 222 and a user last name field 224 are also stored in the MUT 204. A user date of birth (DOB) field 226, a user social security number (SSN) field 228, and a user email field 230, are similarly stored in the MUT 204. A user city field 232 is stored in the MUT 204 and designates the city where the user works, not necessarily their home. In some embodiments, user home address fields are included in each record of the MUT 204. In some embodiments the user city field 232 is one of several user location fields defining user work address and user home address including street number, office or unit number, street name, city name, state name, country name, zip code, etc. A user title field 234 is stored in the MUT 204 and designates a title associated with the user's position within the entity. A user manager field 236 is stored in the MUT 204 and designates the user's immediate manager in the organization. In some embodiments the user manager field 236 includes at least one of a name, an employee number, a telephone number, and an email address associated with the user's manager. In some embodiments, additional managers in the management hierarchy are specified in corresponding fields in the MUT 204. A user hire date field 238 and user termination date field 240 are stored in the MUT 204 to complete each record. In some embodiments, a responsibilities field is included in each record in the MUT 204. In some embodiments an organization field is included in each record in the MUT 204.

The record data fields include fields 206, 210, 212 and 214. The unique user ID field is field 208. The user data fields are fields containing specified types of data corresponding to a user, such as fields 216-240. In some embodiments, the MUT 204 contains multiple records each associated with one unique user ID stored in the master record ID field 208.

In some situations, low precedence and/or insufficient data received by the identity mapping database 202 under specified precedence rules indicate that certain user data fields 216-240 are not populated or the available data is not sufficiently reliable. In those situations the identity mapping database 202 indicates this condition and provides a list of unmatched user data fields 216-240 and enables manual intervention to attempt to match a unique user ID associated with those unmatched user data fields 216-240. In some embodiments, manual intervention includes manual population or revision of record fields in the MUT 204.

In some embodiments, the MUT 204 is exported. An exported MUT is not limited to any particular format. In some embodiments, exporting a MUT includes producing standards-based provisioning messages based on the MUT reports. In some embodiments, the exported MUT is exported to a file that complies with Security Assertion Markup Language (SAML) for login capabilities, or Smart Common Input Method (SCIM) for provisioning.

Figure 2B:
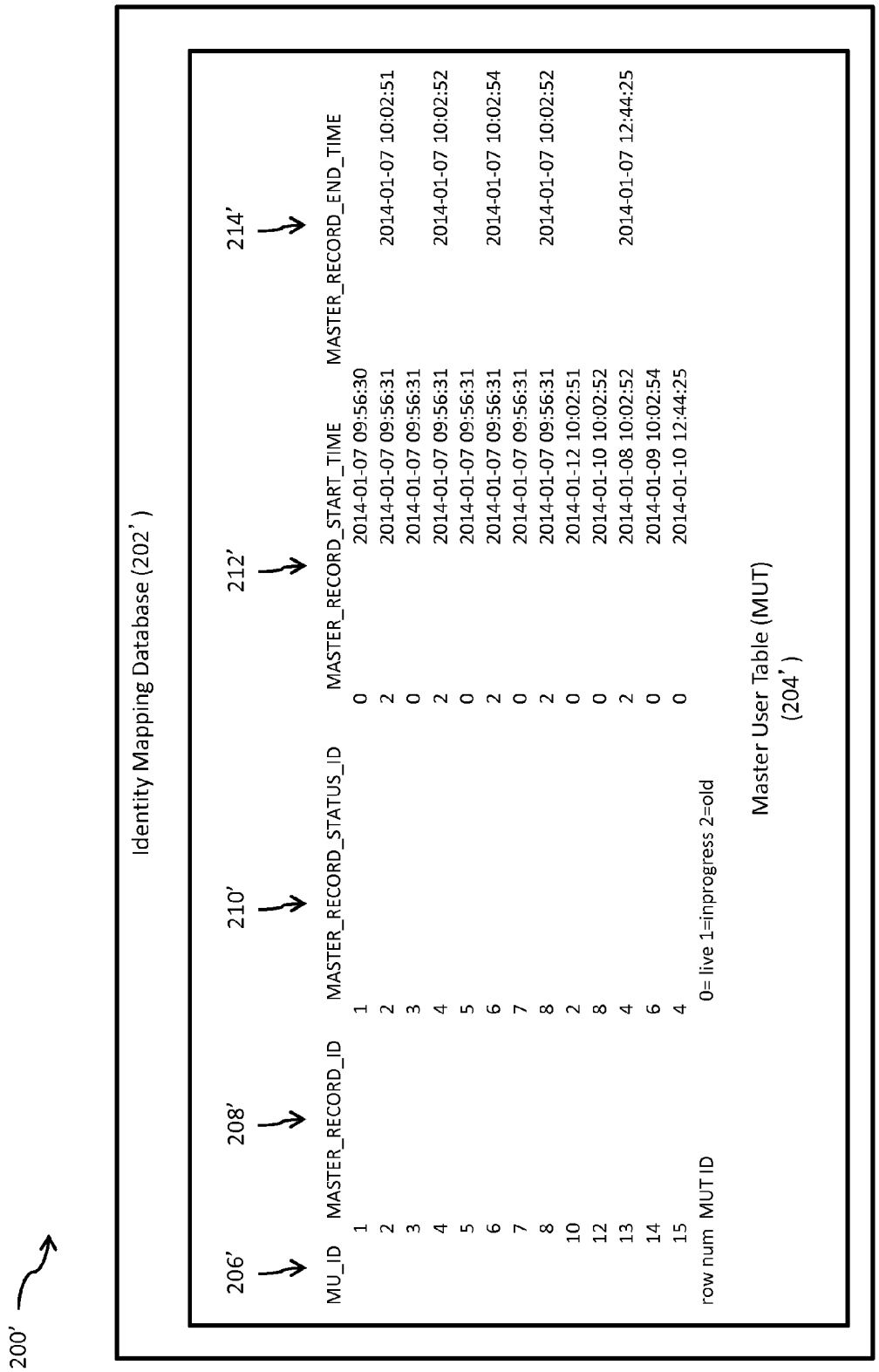
FIGS. 2B-2D are block diagrams of an identity mapping database portion of an identity mapping system each containing exemplary sequential portions of a populated Master User Table (MUT) in accordance with some embodiments.
Figure 2C:
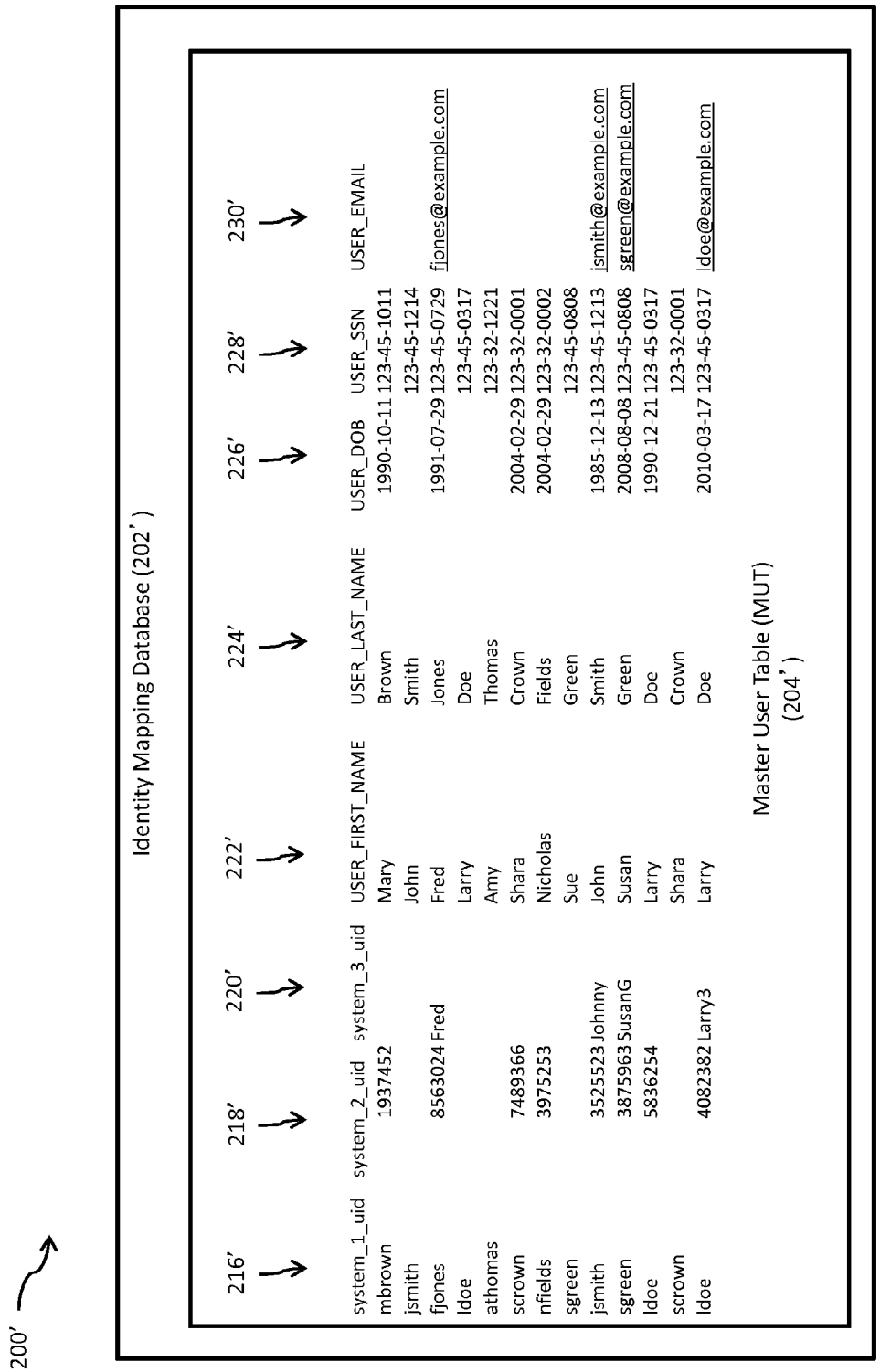
Figure 2D:
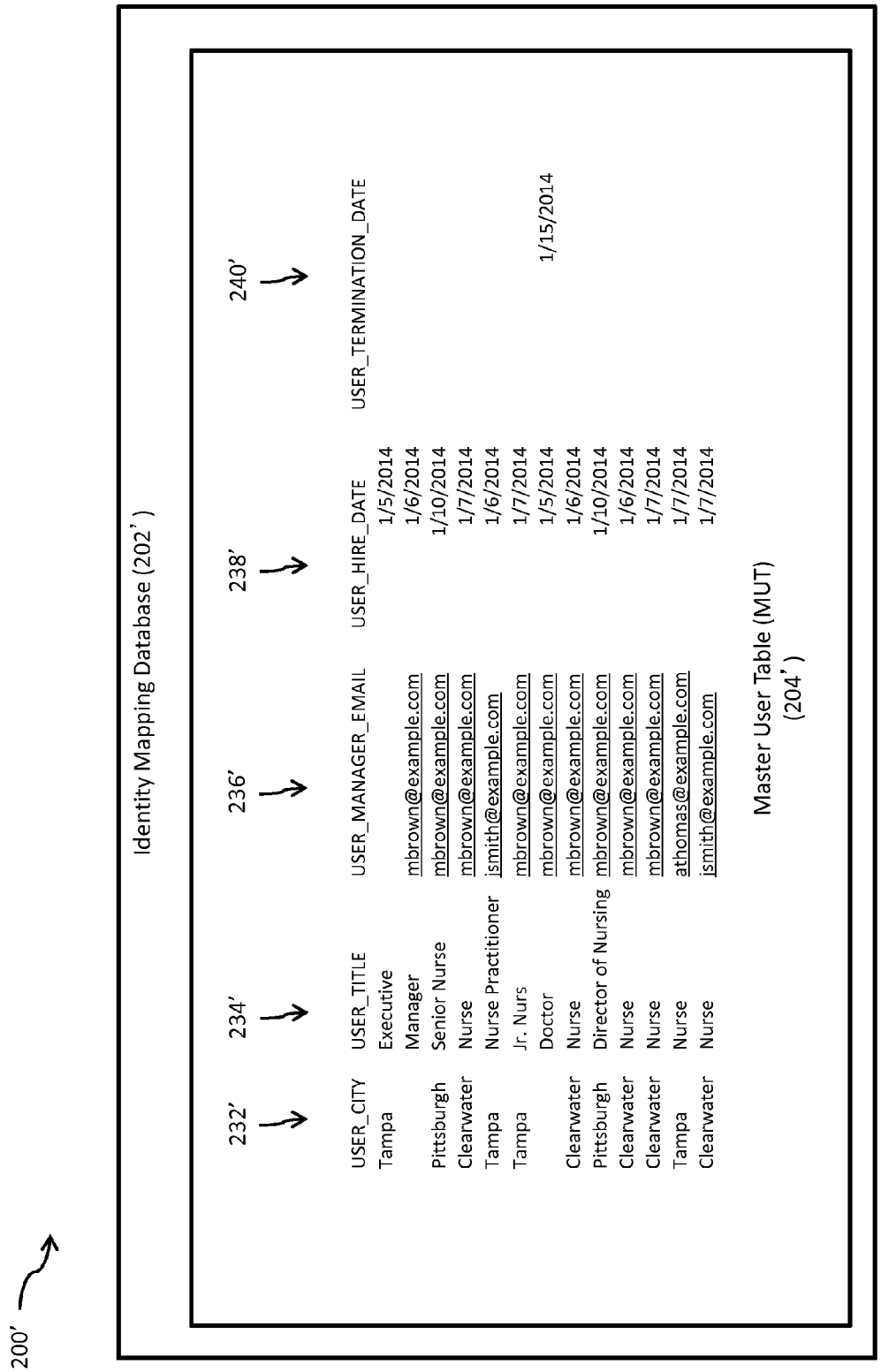

FIGS. 2B-2D are block diagrams of an identity mapping database portion 202' of an identity mapping system 200' each containing exemplary sequential portions of a populated Master User Table (MUT) 204' in accordance with some embodiments. As used herein, reference numerals having a "prime" designation ('), such as MUT 204' are specific examples of, and correspond to, reference numerals without the prime designation, such as MUT 204 in FIG. 2A. Identity mapping database 202' includes master user table (MUT) 204' having a number of records each having some exemplary populated data fields. As shown in FIGS. 2B-2D, the identity mapping database 202' includes eighteen (18) fields in each record in a single row of a master user table (MUT) 204'.

In FIG. 2B, the MUT 204' contains a master user (MU) identification (ID) field 206', a master record identification (ID) field 208', a master record status ID field 210', a master record start time field 212' and a master record stop time field 214'.

In FIG. 2C, the MUT 204' further contains a system 1 user ID (UID) field 216', a system 2 UID field 218', a system 3 UID field 220', a user first name field 222', a user last name field 224', a user date of birth (DOB) field 226', a user social security number (SSN) field 228', and a user email field 230'.

In FIG. 2D, the MUT 204' still further contains a user city field 232', a user title field 234', a user manager field 236', a user hire date field 238', and a user termination date field 240'. As illustrated in FIGS. 2B-2D, some fields 206'-240' are completed and some fields are not completed. For example, the user termination date field 240' is only completed (Jan. 15, 2014) in one record as illustrated in FIG. 2D.

Figure 3:
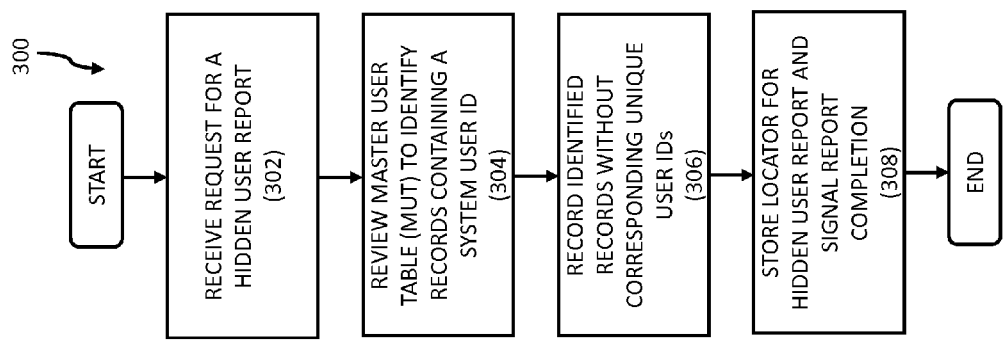
FIG. 3 is a flow chart of an identity mapping method for providing a hidden users report in accordance with some embodiments.

FIG. 3 is a flow chart of an identity mapping method for providing a hidden users report 300 in accordance with some embodiments. The hidden users report is used to identify users known to individual software applications, but not identified by a corresponding unique user identification (ID). The hidden users report is provided to enable review for missing unique user ID information, provisioning policy violations, unauthorized software application access and other problems associated with incompletely identified user access.

In operation 302 an identity mapping database receives a request for a hidden users report. In operation 304 the identity mapping database reviews a master user table (MUT) for records containing one or more entries in a system 1 user identification (UID) field, a system 2 UID field and/or a system 3 UID field. In some embodiments there are N system UID fields in each record where N is positive integer as described above. In operation 306 the identity mapping database records those records having one or more populated system UID fields, but no corresponding unique user ID in a master record ID field. In operation 308 the identity mapping database stores a locator corresponding to the hidden user report and signals completion of the hidden user report.

Figure 4:
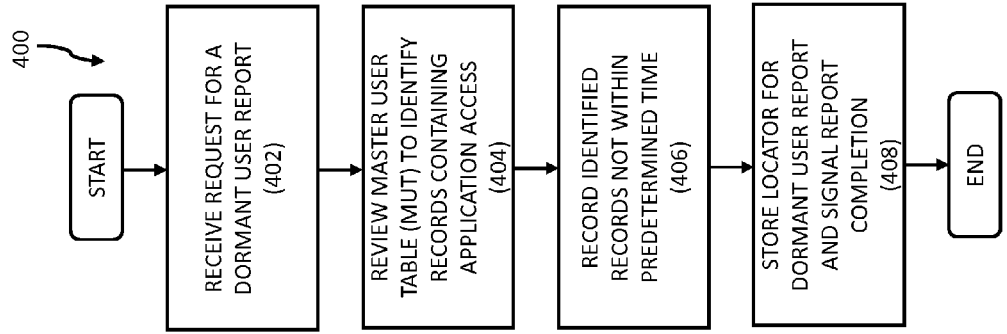
FIG. 4 is a flow chart of an identity mapping method for providing a dormant users report in accordance with some embodiments.

FIG. 4 is a flow chart of an identity mapping method for providing a dormant users report 400 in accordance with some embodiments. The dormant users report is used to identify users known to a software application that have not had recent interaction with that software application as defined by a predetermined time or time period as indicated by data received by a master user table (MUT) from access logs. In some embodiments a unique user ID or other user data is associated with a dormant user, enabling that user to be contacted to determine if they want to maintain their user ID. In other embodiments, the user is not contacted and access with that user ID is suspended or revoked. The dormant users report is provided to enable review for unnecessary user IDs to reduce unnecessary software application user fees and risks associated with dormant user IDs.

In operation 402 an identity mapping database receives a request for a dormant users report. In operation 404 the identity mapping database reviews a master user table (MUT) to identify records derived from access logs containing a master record start time and a master record end time with system N UID software application access. In some embodiments there are N system UID fields in each record where N is positive integer. In operation 406 the identity mapping database compares records identified in operation 404 with a predetermined time or time period and records the most recent records for each user ID if none are after the predetermined time or within the predetermined time period. In operation 408 the identity mapping database stores a locator corresponding to the dormant user report and signals completion of the dormant user report.

Figure 5:
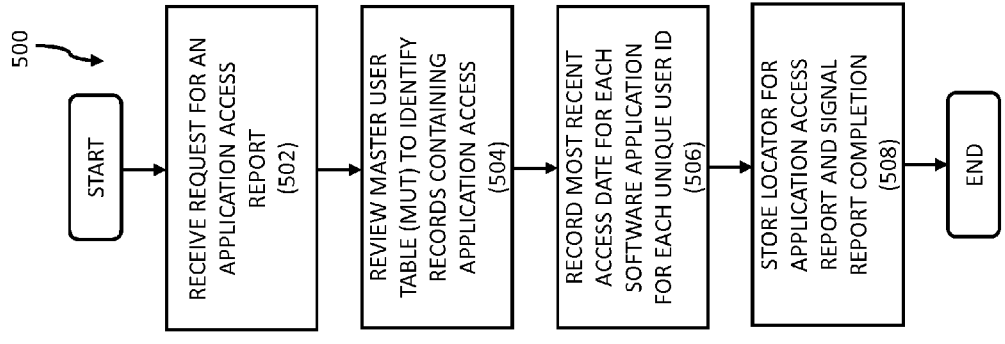
FIG. 5 is a flow chart of an identity mapping method for providing an application access report in accordance with some embodiments.

FIG. 5 is a flow chart of an identity mapping method for providing an application access report 500 in accordance with some embodiments. For each user, the application access report identifies the most recent access date for each software application associated with that user. In some embodiments the most recent access date for each software application is associated with a unique user ID. In other embodiments, the most recent access date for each software application is associated with a system N UID field. The application access report is provided to enable review for duplicative or otherwise unnecessary user IDs to reduce unnecessary software application user fees and risks associated with unnecessary user IDs.

In operation 502 an identity mapping database receives a request for an application access report. In operation 504 an identity mapping database reviews a master user table (MUT) to identify records derived from access logs containing a master record start time and a master record end time with system N UID software application access. In some embodiments there are N system UID fields in each record where N is positive integer. In operation 506 the identity mapping database compares records in the MUT and records the most recent software application access for each unique user ID. In operation 508 the identity mapping database stores a locator corresponding to the application access report and signals completion of the application access report.

Figure 6:
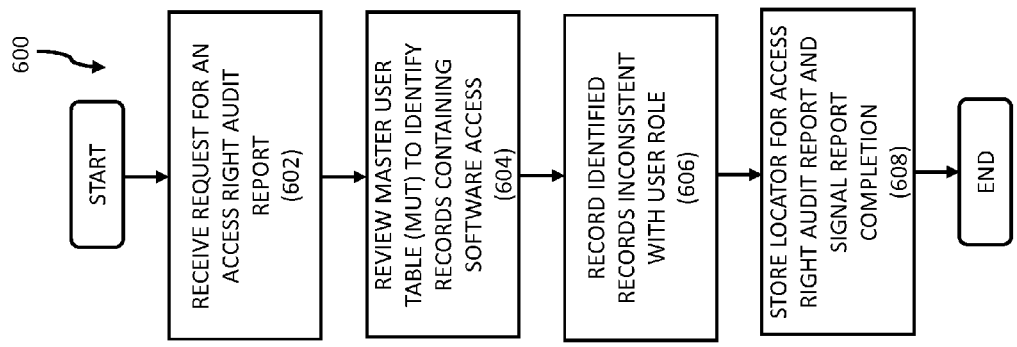
FIG. 6 is a flow chart of an identity mapping method for providing an access right audit report in accordance with some embodiments.

FIG. 6 is a flow chart of an identity mapping method for providing an access right audit report 600 in accordance with some embodiments. For each unique user ID, the access right audit report, also known as a separation of duties report, identifies software application access inconsistent with organizational rules. In some embodiments, for example, a user identified by title as a doctor in a health care organization should have access to five separate software applications and not have access to ten other software applications under organization policies, such as organization access policies. Variations from suggested or required software application access and restricted software application access are detected and flagged for review. In some embodiments, the access right audit report recommends provisioning of some additional software access and deprovisioning of some other software access based on a user's identified role in the organization. In some embodiments, other user data fields are used to identify inconsistencies between software access and organization policy.

In operation 602, an identity mapping database receives a request for an access right audit report. In operation 604, the identity mapping database reviews a master user table (MUT) to identify records having software access designated by one or more system user identification (UID) fields, a master record start time and a master record end time. In operation 606, the identity mapping database compares fields identified in operation 604 to identify software access inconsistent with user role as indicated by one or more of user city, user title, user manager, user hire date, user termination date records in the MUT and records those records indicative of software access inconsistent with user role. In some embodiments, role is a separate record field specified by a role definition report, described below. In operation 608, the identity mapping database stores a locator corresponding to the access right audit report and signals completion of the access right audit report.

Figure 7:
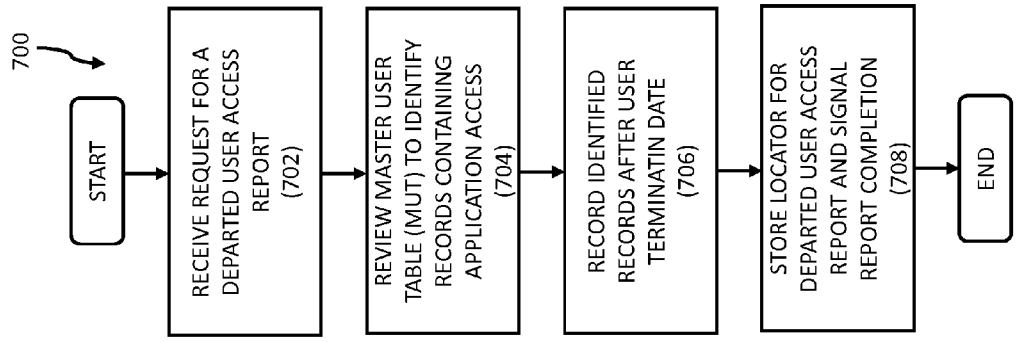
FIG. 7 is a flow chart of an identity mapping method for providing a departed user access report in accordance with some embodiments.

FIG. 7 is a flow chart of an identity mapping method for providing a departed user access report 700 in accordance with some embodiments. For each unique user ID, the departed user access report identifies software application access after a user's termination date. In some embodiments, the departed user access report recommends deprovisioning of software access based on a user's termination date with the organization.

In operation 702, an identity mapping database receives a request for a departed user access report. In operation 704, the identity mapping database reviews a master user table (MUT) to identify records having software access designated by one or more system user identification (UID) fields, a master record start time and a master record end time. In operation 706, the identity mapping database compares fields identified in operation 704 to identify software access after a user termination date field in the MUT and records those records indicative of software access after user termination with the organization. In operation 708, the identity mapping database stores a locator corresponding to the departed user access report and signals completion of the departed user access report.

Figure 8:
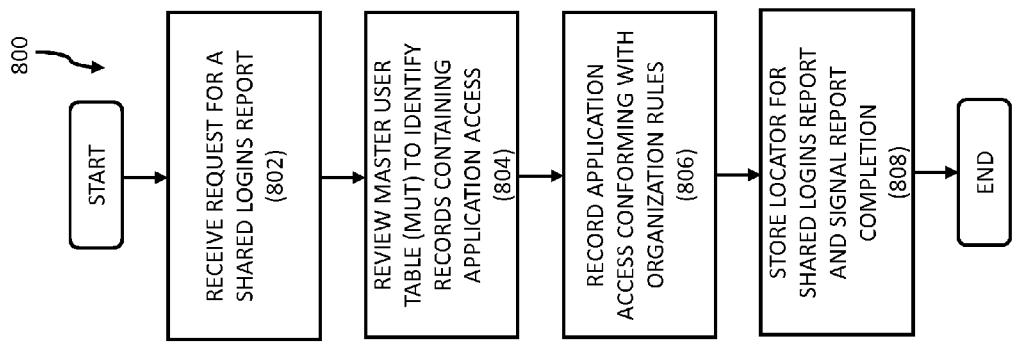
FIG. 8 is a flow chart of an identity mapping method for providing a shared logins report in accordance with some embodiments.

FIG. 8 is a flow chart of an identity mapping method for providing a shared logins report 800 in accordance with some embodiments. An identity mapping database searches a MUT for populated system user identification (UID) fields. When organizational rules indicate these fields are associated with a shared login, records with these UID fields are designed as shared logins. In some embodiments, a flag is set in a shared login field, e.g., a non-zero number is stored in the shared login field. Identification of shared logins provides a more complete picture of the user community and whether corresponding organization policies are being complied with.

In some embodiments, an amount of access time over a defined time period is compiled from audit logs. If the amount of access time is significantly greater than other users with similar positions or in the same department over the same time period, e.g., more than double, that UID is flagged as potentially being a shared login and listed on the shared login report.

In operation 802, an identity mapping database receives a request for a shared logins report. In operation 804, the identity mapping database reviews a MUT to identify records having software access designated by one or more populated system UID fields and other user data fields. In operation 806, the identity mapping database compares fields identified in operation 804 to identify shared software access conforming with organization policies. In operation 808, the identity mapping database stores a locator corresponding to the shared logins report and signals completion of the shared logins report.

Figure 9:
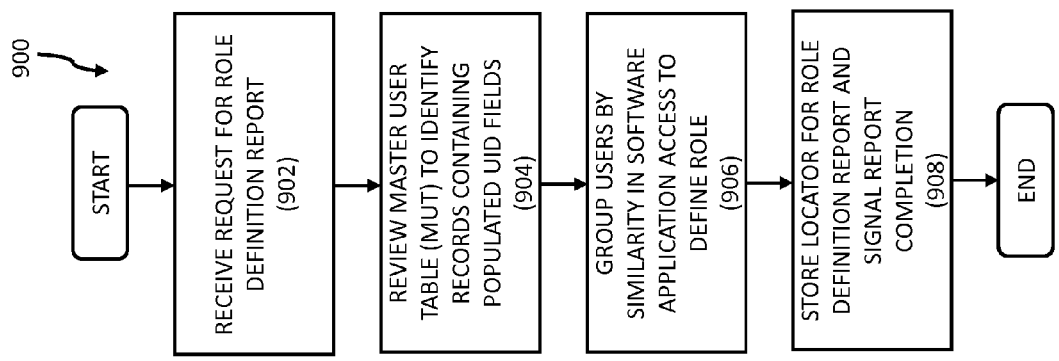
FIG. 9 is a flow chart of an identity mapping method for providing a role definition report in accordance with some embodiments.

FIG. 9 is a flow chart of an identity mapping method of providing a role definition report 900 in accordance with some embodiments. An identity mapping database searches a MUT for groups of users having the same or similar software application access. A statistical survey of populated system user identification (UID) fields is performed in order to group users by software access attributes such as similar highest to lowest frequency of software application use to define their role from a software access perspective. In some embodiments, groups of users are further divided into separate roles based on user data such as user title, user location, etc. In some embodiments, the role definition report is further reviewed by organization representatives to manually adjust and finalize role definition in terms of software application access. In some embodiments, automatic software access provisioning is performed based at least in part on the role definition report. In some embodiments, the role definition report defines more than one role for the same title. For example, the role definition report identifies a sub-class of vice presidents that all use two particular software applications, while other vice presidents do not. In this example, the role definition report makes a distinction between different groups of vice presidents that was previously unknown to the organization.

In operation 902, an identity mapping database receives a request for a role definition report. In operation 904, the identity mapping database reviews a MUT to identify records having populated system UID fields associated with software application access. In operation 906, the identity mapping database groups users into similar roles based on similar software access patterns in view of master record start time and end time fields as well as the quantity of records corresponding to each software application. In operation 908, the identity mapping database stores a locator corresponding to the role definition report and signals completion of the role definition report.

Figure 10:
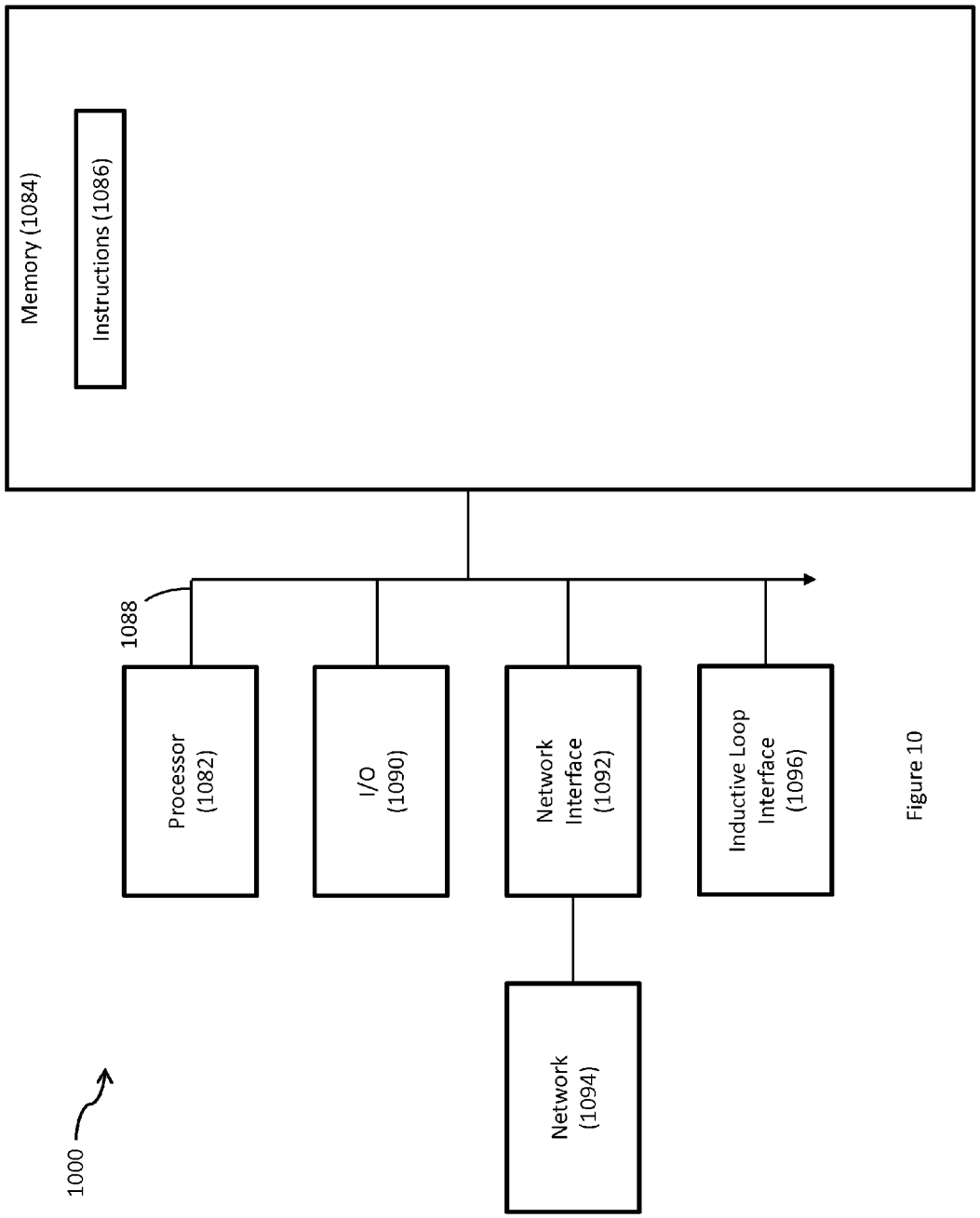
FIG. 10 is a block diagram of a computer system portion of an identity mapping system in accordance with some embodiments.

FIG. 10 is a block diagram of a computer system 1000 portion of an identity mapping system in accordance with some embodiments. In some embodiments, the computer system 1000 is part of the repositories of data 100-116 (FIG. 1). In other embodiments, the computer system 1000 is part of the identity mapping database (FIGS. 1-9). In still other embodiments, the computer system 1000 is part of the master user table (MUT) (FIGS. 1-9). Computer system 1000 includes a hardware processor 1082 and a non-transitory, computer readable storage medium 1084 encoded with, i.e., storing, the computer program code 1086, i.e., a set of executable instructions. The processor 1082 is electrically coupled to the computer readable storage medium 1084 via a bus 1088. The processor 1082 is also electrically coupled to an I/O interface 1090 by bus 1088. A network interface 1092 is also electrically connected to the processor 1082 via bus 1088. Network interface 1092 is connected to a network 1094, so that processor 1082 and computer readable storage medium 1084 are capable of connecting and communicating to external elements via network 1094. An inductive loop interface 1096 is also electrically connected to the processor 1082 via bus 1088. Inductive loop interface 1096 provides a diverse communication path from the network interface 1092. In some embodiments, inductive loop interface 1096 or network interface 1092 are replaced with a different communication path such as optical communication, microwave communication, or other suitable communication paths. The processor 1082 is configured to execute the computer program code 1086 encoded in the computer readable storage medium 1084 in order to cause computer system 1000 to be usable for performing a portion or all of the operations as described with respect to generating reports with the identity mapping system (FIGS. 3-9).

In some embodiments, the processor 1082 is a central processing unit (CPU), a multi-processor, a distributed processing system, an application specific integrated circuit (ASIC), and/or a suitable processing unit.

In some embodiments, the computer readable storage medium 1084 is an electronic, magnetic, optical, electromagnetic, infrared, and/or a semiconductor system (or apparatus or device). For example, the computer readable storage medium 1084 includes a semiconductor or solid-state memory, a magnetic tape, a removable computer diskette, a random access memory (RAM), a read-only memory (ROM), a rigid magnetic disk, and/or an optical disk. In some embodiments using optical disks, the computer readable storage medium 1084 includes a compact disk-read only memory (CD-ROM), a compact disk-read/write (CD-R/W), a digital video disc (DVD) and/or Blu-Ray Disk.

In some embodiments, the storage medium 1084 stores the computer program code 1086 configured to cause computer system 1000 to perform the operations as described with respect to the repositories of data 100-116 (FIG. 1), the identity mapping database (FIGS. 1-9), and the master user table (MUT) (FIGS. 1-9 and 11-13).

In some embodiments, the storage medium 1084 stores instructions 1086 for interfacing with external components. The instructions 1086 enable processor 1082 to generate operating instructions readable by identity mapping system.

Computer system 1000 includes I/O interface 1090. I/O interface 1090 is coupled to external circuitry. In some embodiments, I/O interface 1090 includes a keyboard, keypad, mouse, trackball, trackpad, and/or cursor direction keys for communicating information and commands to processor 1082.

Computer system 1000 also includes network interface 1092 coupled to the processor 1082. Network interface 1092 allows computer system 1000 to communicate with network 1094, to which one or more other computer systems are connected. Network interface 1092 includes wireless network interfaces such as BLUETOOTH, WIFI, WIMAX, GPRS, or WCDMA; or wired network interface such as ETHERNET, USB, or IEEE-1394.

Computer system 1000 also includes inductive loop interface 1096 coupled to the processor 1082. Inductive loop interface 1096 allows computer system 1000 to communicate with external devices, to which one or more other computer systems are connected. In some embodiments, the operations as described above are implemented in two or more computer systems 1090.

Computer system 1000 is configured to receive information related to the instructions 1086 through I/O interface 1090. The information is transferred to processor 1082 via bus 1088 to determine corresponding adjustments to the transportation operation. The instructions are then stored in computer readable medium 1084 as instructions 1086.

Identity Sources and Identity Rules

In some embodiments, corporate or other entities have identity rules specifying where their users' data resides (identity sources). For example, a first entity has an identity rule that requires its users to have an account on an LDAP server. A second entity has an identity rule that requires its employees' data be in a System A and another identity rule that requires its contractors' data be in a System B, so the second entity specifies that all its users' data must reside in either System A or System B. A third entity is similar to the second entity, but employs a further identity rule that requires that a user's data cannot exist in both System A and System B. These identity rules work to together to specify identity sources. As shown in FIG. 2, identity sources provide information for user data fields 216-240 in the MUT 204. Defining one or more identity sources (and the identity rules that define and relate them) enables detection of errors and/or irregularities in compliance with that entity's policies. In some embodiments, with these identity sources in place, the system 200 detects when a user is not found in System A or System B, but is found in a System C. This indicates that there is an identity rule violation. The system 200 presents a record of the user from System C and in some embodiments requests an administrator to identify the Master User Table (MUT) 204 record with which the System C user should be associated. In the process, the administrator is informed an identity rule (and corresponding policy) is apparently being violated, a provisioning problem exists, or the identity rules need adjustment. In some embodiments, if one or more fields designating a user from an identity source are not matched to an existing MUT entry, then a new MUT entry is created for that user.

Figure 11:
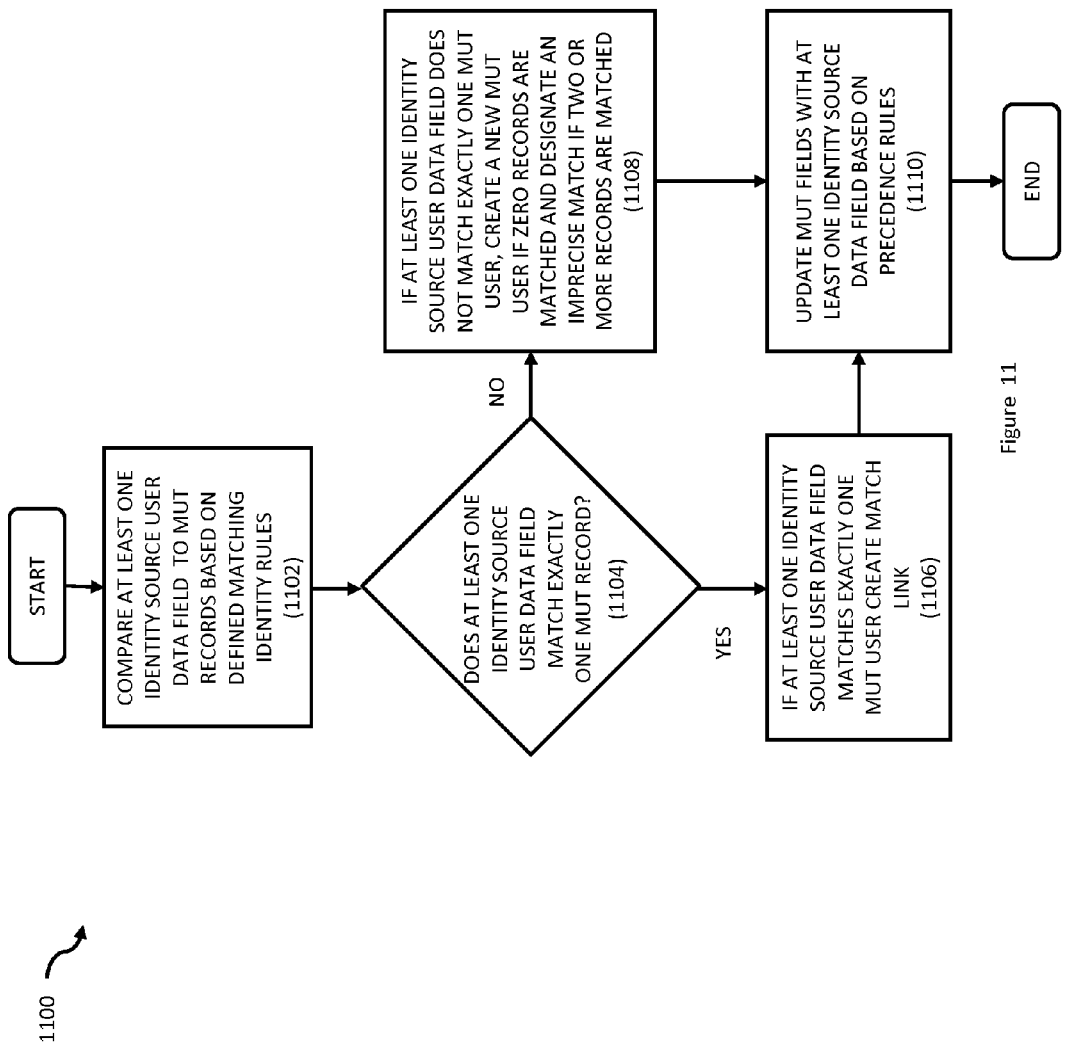
FIG. 11 is a flow chart of an identity rules portion of an identity mapping method in accordance with some embodiments.

FIG. 11 is a flow chart of an identity rules portion 1100 of an identity mapping method in accordance with some embodiments. In operation 1102, at least one identity source user data field not matched to a System 1 through System N user ID is compared to records in the MUT according to defined matching rules. In some embodiments, user data fields are attributes of a record, or other representation, each containing user-specific information about a particular user. The matching rules specify whether the strength of the match is adequate to designate a match between the user's entry in the identity source and a record in the MUT based on attributes of the user in the identity source and the attributes of the MUT entries. The matching rules specify which attributes of the identity source entry are compared to which attributes of the MUT entries. In operation 1104, if the at least one identity source user data field matches exactly one MUT record, proceed to operation 1106 where a matching MUT record is indicated and a link created between the at least one identity source user data field and the matching MUT record, otherwise, if the at least one identity source user data field does not match exactly one MUT record, proceed to operation 1108. In operation 1108 a new unique MUT user ID is created if zero MUT records are matched, otherwise, if two or more records in the MUT are matched those records are designated as imprecise. In some embodiments, if subsequent matching rules cannot identify a singular master user record, a corresponding imprecise record becomes an unmatched record subject to administrative review. In operation 1110 MUT fields are updated per predetermined precedence rules as indicated by operations 1106, 1108. If operation 1106 preceded operation 1110, the identity source user ID is stored with data from the matching MUT record. If operation 1108 preceded operation 1110, the identity source user ID is stored with the new unique user ID in the MUT record if zero records matched. In some embodiments, for example, if Identity Source A changes a MUT record's SSN, and Identity Source B matches on the SSN, and this MUT record has a user ID for Identity Source B, then that user ID should be re-evaluated to determine if it should continue to be matched to this MUT record.

Automated Match Process

Figure 12:
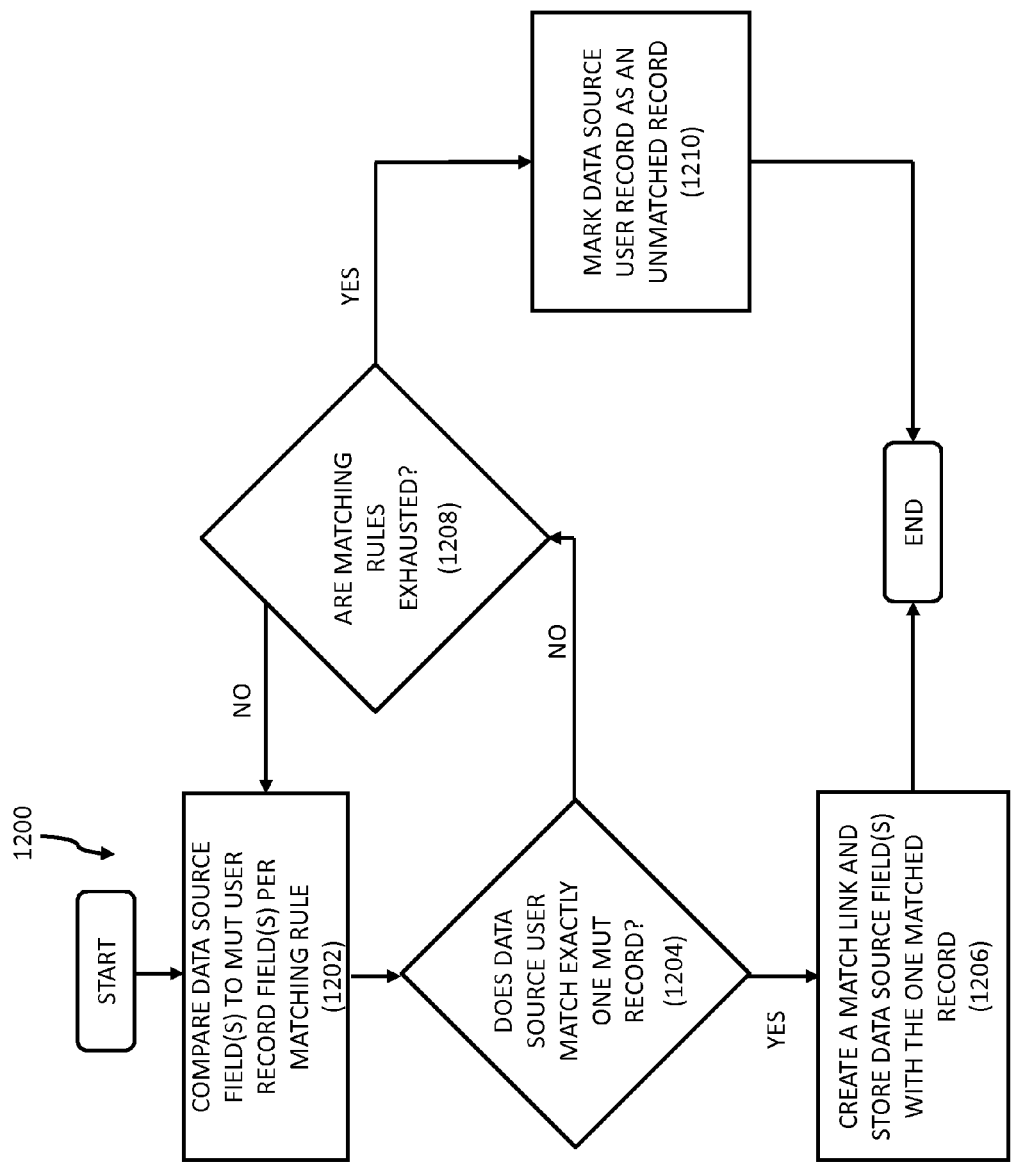
FIG. 12 is a flow chart of an automated matching process portion of an identity mapping method in accordance with some embodiments.

FIG. 12 is a flow chart of an automated matching process 1200 portion of an identity mapping method in accordance with some embodiments. With the MUT having a number of populated records, records from a software application data source are automatically reviewed for user fields not previously matched to MUT records according to one or more matching rules. Matching rules determine which populated user fields in the software application data source are compared against which fields in the MUT records to determine if they represent the same user, i.e., a match. In some embodiments, matching rules are prioritized to reflect the reliability of fields in the software application data source for identification purposes. For example, in some embodiments, a matching rule comparing a social security number (SSN) user data field in the software application data source against the corresponding SSN field in the MUT records is performed before a matching rule that compares date of birth (DOB) and last name because the SSN user data field is presumably more uniquely identifying than DOB and last name fields combination.

In operation 1202, one or more fields from a software application data source associated with a user are compared with records in the MUT per a matching rule. In operation 1204, if the one or more fields in the data source match exactly one MUT record, the flow proceeds to operation 1206, otherwise proceed to operation 1208. In operation 1206, a match link is created between the data source fields and the one matched MUT record. In operation 1208, because exactly one MUT record was not found, if no more matching rules exist, the flow proceeds to operation 1210, otherwise, return back to operation 1202 and apply a next matching rule. In operation 1210, because the matching rules have been exhausted without identifying exactly one MUT record, the data source user record is marked as an unmatched record.

Administrative Match Process

Figure 13:
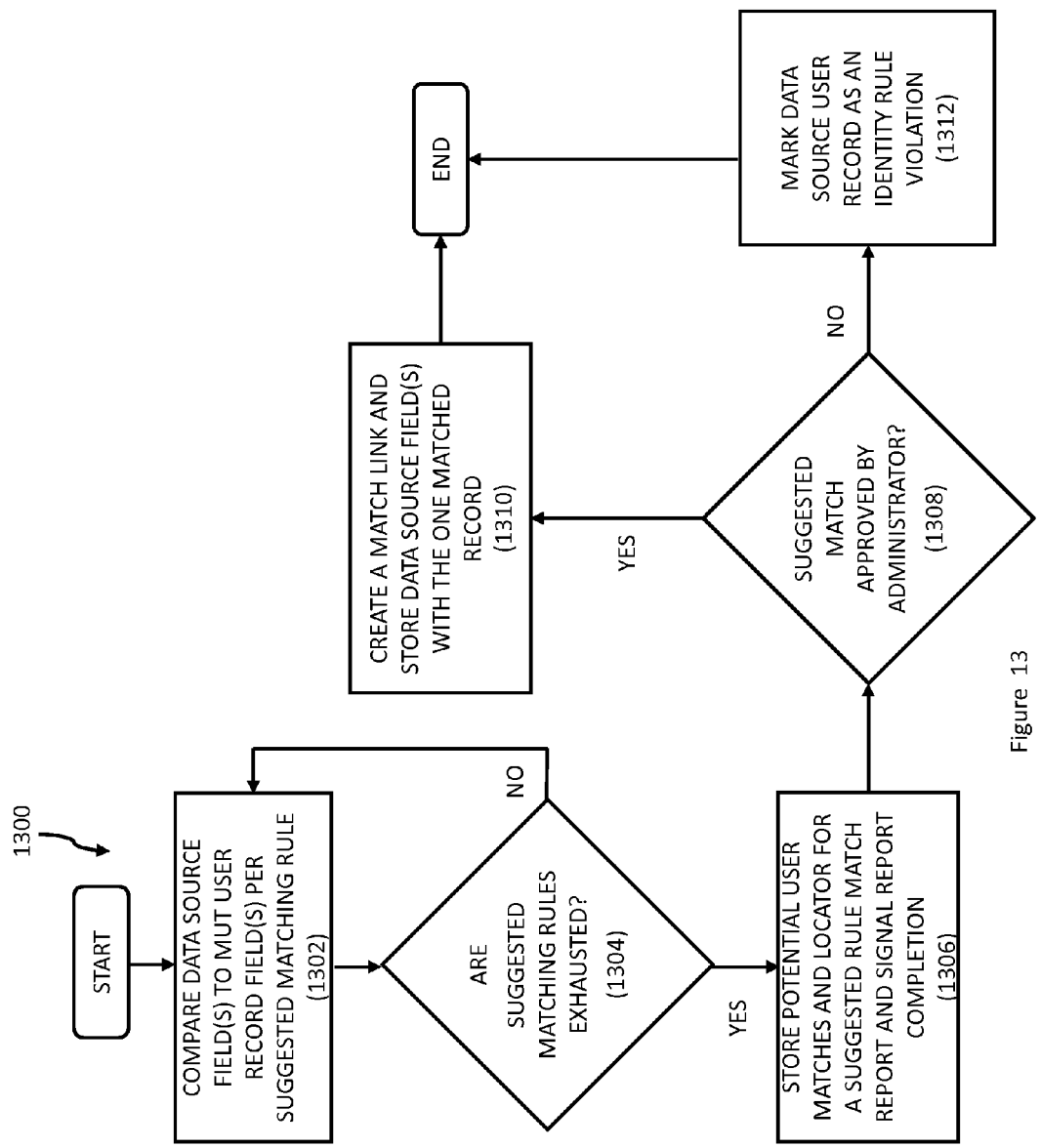
FIG. 13 is a flow chart of an administrative matching process portion of an identity mapping method in accordance with some embodiments.

FIG. 13 is a flow chart of an administrative matching process 1300 portion of an identity mapping method in accordance with some embodiments. Data source user records marked as unmatched records by the automated match process receive further review and administrative scrutiny under the administrative match process. The administrative match process uses suggested matching rules to reduce a pool of possible MUT record matches but still retain the flexibility to identify potential match candidates in the MUT records. Suggested match rules, while not as dispositive as matching rules, and therefore not used in the automated match process, are still positively correlated with matching software application data source records with MUT records. In some embodiments there are multiple suggested matching rules prioritized similarly as the matching rules, matching rules are prioritized to reflect the reliability of fields in the software application data source for identification purposes from highest to lowest.

In operation 1302 one or more fields from a software application data source associated with a user are compared with records in the MUT per a suggested matching rule. In operation 1304, if the suggested matching rules are not yet exhausted, the flow returns to operation 1302, if the suggest matching rules are exhausted, the flow proceeds to operation 1306. In operation 1306, suggested user matches are stored with a suggested rule match report, a locator for the report is generated, and report completion is signaled. In operation 1308, if a suggested match between a record in the software application data source and a record in the MUT is approved by an administrator (or other reviewer), then the flow proceeds to operation 1310, otherwise the flow proceeds to operation 1312. In operation 1310, a match link is created between the data source fields and the one matched MUT record. In operation 1312, because no suggested match was approved by an administrator, the record without an approved match is marked as an identity rule violation for further review, including in some embodiments, notification to some users and user ID deletion.

Some embodiments include an identity mapping system. The identity mapping system includes an identity mapping database and a master user table (MUT) communicatively coupled with the identity mapping database. The MUT includes a record having at least one record data field, a unique user identification (ID) field and at least one user data field. The at least one user data field contains data from a software application.

Some embodiments include an identity mapping system. The identity mapping system includes at least one user identification (UID) associated with a software application. The identity mapping system also includes at least one access log having data descriptive of user access of the at least one software application. The identity mapping system further includes at least one human resources (HR) directory having user data selected from a primary active HR directory, additional active HR directories and other HR directories. The identity mapping system includes an identity mapping database and a master user table (MUT) communicatively coupled with the identity mapping database, wherein the MUT includes a record having at least one record data field, a unique user identification (ID) field and at least one user data field, the at least one user data field containing data selected by a highest priority assigned to one of the at least one software application, the at least one access log and the at least one human resources (HR) directory.

Some embodiments include a method of automatically generating a report with an identity mapping system. The method includes receiving a request for a report with an identity mapping database. The method further includes reviewing master user table (MUT) records with the identity mapping database to identify first records corresponding to the request for the report by comparing a first field in the MUT records. The method still further includes identifying second records from the first records by comparing a second field in the first records and recording at least some portion of each of the second records in the report.

Some embodiments include a method of identifying a user of a software application. The method includes applying a rule for comparing at least one user field from the software application against a corresponding field in a record in a master user table (MUT), wherein the at least one user field is not associated with a known user of the software application. The method further includes identifying a match by comparing the at least one field from the software application against the corresponding field in the record in the master user table (MUT), wherein a portion of the at least one user field from the software application is identical to a portion of the corresponding field in the record in the master user table (MUT), and the record in the master user table (MUT) is associated with a known individual.

One of ordinary skill in the art will recognize the operations of the various methods disclosed are merely examples, and additional operations are includable, describe operations are removable and an order of operations are adjustable without deviating from the scope of those methods disclosed.

It will be readily seen by one of ordinary skill in the art that the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An identity mapping system, comprising:
an identity mapping database;
an access log including first user data related to user access of a first software application and second user data related to user access of a second software application, wherein the first software application is different from the second software application, and the first software application and the second software application are individually associated with respective users; and
a master user table (MUT) communicatively coupled with the identity mapping database and the access log, wherein the MUT includes a first record having a first record data field, a unique user identification (ID) field and a first user data field, the first user data field containing the first user data from the first software application, and a second record having a second record data field different than the first record data field, the unique user identification (ID) field and a second user data field different than the first user data field, the second user data field containing the second user data from the second software application.

2. The identity mapping system of claim 1, wherein the MUT is exported from one of a database table, a directory service or a spreadsheet and wherein the user data includes identification of the first software application, the second software application, a record accessed, a number of records accessed, a start time of access, an end time of access, a location of access, or a user identification (UID).

3. The identity mapping system of claim 1, wherein the at least one record data field includes a unique record number associated with each record.

4. The identity mapping system of claim 3, wherein the unique record number associated with each record is a row number in the MUT.

5. The identity mapping system of claim 1, wherein the at least one record data field includes a master record start time field and a master record end time field.

6. The identity mapping system of claim 1, wherein the at least one user data field containing data from a software application includes a user hire date field and a user termination date field.

7. The identity mapping system of claim 1, wherein the at least one record data field includes a master record start time field and a master record end time field.

8. The identity mapping system of claim 1, wherein the at least one user data field containing data from a software application includes a user hire date field and a user termination date field.

9. The identity mapping system of claim 1, wherein the first software application and the second software application have different perceived reliabilities.

10. An identity mapping system, comprising:
an access log including first user data related to user access of a software application, the access log including a first user identification (UID) associated with a first software application and a second user identification (UID) associated with a second software application different than the first software application, wherein the first software application and the second software application are individually associated with respective users;

at least one human resources (HR) directory having second user data selected from a primary active HR directory, additional active HR directories or other HR directories;
an identity mapping database; and
a master user table (MUT) communicatively coupled with the identity mapping database, wherein the MUT includes a record having at least one record data field, a unique user identification (ID) field and at least one user data field, the at least one user data field comprising the first user data or the second user data selected by a highest priority assigned to one of the access log and the at least one human resources (HR) directory.

11. The identity mapping system of claim 10, wherein the at least one user data field is populated with user data from the at least one HR directory having a higher priority than user data from the software application.

12. The identity mapping system of claim 10, wherein the at least one user data field is populated with user data from the at least one HR directory having a higher priority than user data from an at least one access log.

13. The identity mapping system of claim 10, wherein the at least one user data field is populated with user data from the at least one access log having a higher priority than user data from the at least one at least one HR directory.

14. The identity mapping system of claim 10, wherein the first software application and the second software application have different perceived reliabilities.

15. A method of automatically generating a report with an identity mapping system, comprising:
reviewing one or more master user table (MUT) records with an identity mapping database to identify first records corresponding to a request for a report by comparing a first field in the MUT records;
identifying second records from the first records by comparing a second field in the first records; and
recording at least a portion of each of the second records in the report,
wherein the MUT includes a first user data field and a second user data field each having user data from an access log, the access log including the user data related to user access of a first software application and a second software application different than the first software application, and the first software application and the second software application are individually associated with respective users.

16. The method of claim 15 wherein the requested report is a hidden users report that identifies users having a username for at least one software application and not having a unique user identification (ID).

17. The method of claim 15 wherein the requested report is a dormant users report that identifies users having a username for at least one software application that have not had recent interaction with that software application as defined by a predetermined time or time period.

18. The method of claim 15 wherein the requested report is an application access report that identifies a most recent access date for each software application associated with a user.

19. The method of claim 15 wherein the requested report is an access right audit report that identifies software application access inconsistent with at least one organizational rule.

20. The method of claim 15 wherein the requested report is a departed user access report that identifies software application access after a user's termination date.

21. The method of claim 15 wherein the requested report is a shared logins report that designates records as being shared among a plurality of users if at least one organizational rule indicates some fields are associated with a shared login.

22. The method of claim 15 wherein the requested report is a role definition report that groups users having similar highest to lowest frequency of software application use.

23. The method of claim 15, wherein the first software application and the second software application have different perceived reliabilities.

24. A method of identifying a user of a software application, comprising:
applying a rule for comparing at least one user field from the software application against a corresponding field in a record in a master user table (MUT), wherein the at least one user field is not associated with a known user of the software application; and
identifying a match by comparing the at least one field from the software application against the corresponding field in the record in the master user table (MUT), wherein a portion of the at least one user field from the software application is identical to a portion of the corresponding field in the record in the master user table (MUT), and the record in the master user table (MUT) is associated with a known individual,
wherein the MUT includes at least one user data field having user data from an access log, the access log including user data related to user access of the software application and another software application different than the software application, the software application and the another software application are individually associated with respective users.

25. The method of claim 24, wherein the rule is a matching rule selected from a plurality of matching rules based on a priority that reflects a reliability of the at least one user field.

26. The method of claim 24, wherein the rule is a suggested matching rule selected from a plurality of suggested matching rules.

27. The method of claim 24, wherein the rule is a matching rule that identifies more than one field from the software application and one field in the record in the master user table (MUT).

28. The method of claim 27, wherein the one field from the software application and one field in the record in the master user table (MUT) includes a social security number (SSN).

29. The method of claim 24, wherein the rule is a suggested matching rule that identifies more than one field from the software application and one field in the record in the master user table (MUT).

30. The method of claim 29 wherein the one field from the software application and one field in the record in the master user table (MUT) includes a social security number (SSN).

31. The method of claim 24, further comprising:
applying a secondary rule for comparing a secondary user field from the software application against a corresponding secondary field in a record in a master user table (MUT), wherein the secondary field is not associated with a known user of the software application.

32. The method of claim 31, wherein the secondary rule is a matching rule selected from a plurality of matching rules.

33. The method of claim 31, wherein the secondary rule is a suggested matching rule selected from a plurality of suggested matching rules.

34. The method of claim 24, wherein the software application and the another software application have different perceived reliabilities.

* * * * *